3,221,020
ANTHRAQUINONE DYESTUFFS
Rütger Neeff, Leverkusen, Germany, assignor to Farbenfabriken Bayer Aktiengesellschaft, Leverkusen, Germany, a corporation of Germany
No Drawing. Filed Aug. 2, 1962, Ser. No. 214,208
Claims priority, application Germany, Aug. 5, 1961, F 34,621
6 Claims. (Cl. 260—303)

This invention relates to new anthraquinone dyestuffs and to a process for their production.

It is an object of the present invention to provide new anthraquinone dyestuffs with excellent fastness properties. Further objects will appear hereinafter.

We have found that new and valuable vat dyestuffs are obtained if at least two mols of an anthraquinone-2-aldehyde or of a corresponding anil are condensed with one mol dithio oxamide (rubeanic acid).

Anthraquinone aldehydes or anils that can be used are especially anthraquinone-2-aldehyde and its halogeno, amino, acylamino, alkylsulfono, arylsulfono and sulfonamido derivatives or the corresponding anils, as well as anthraquinone-2-aldehyde to which ring structures have been joined by condensation, such as for example 1,9-thiazolanthraquinone-2-aldehyde or its anil. Examples are: anthraquinone-2-aldehyde and 1-chloro-anthraquinone-2-aldehyde, 1-amino-anthraquinone-2-aldehyde, its 6-chloro-; 7-chloro-; 6,7-dichloro-; 6- or 7-chloro-, fluoro-, and bromo derivatives, its 6- or 7-alkyl or arylsulfono or 6- or 7-sulfonamide derivatives or the corresponding anils. We further mention 4- or 5-acyl-amino-1-amino-anthraquinone-2-aldehydes or their anils, wherein the acyl radicals may be, for example, from the following carboxylic acids: benzoic acid, 2-, 3-, or 4-chloro-, bromo-, fluoro-, methyl- or methoxy benzoic acid, 2,4- or 2,5-dichloro or 3,4-dibromo benzoic acid, benzoic acid-3 or -4-alkylsulfones, benzoic acid -4-sulfonamides, cinnamic acid, diphenyl-4-carboxylic acids which may be halogeno-substituted, naphthalene carboxylic acids, and anthraquinone-2-carboxylic acids which may be substituted with nitro or amino groups. The dyestuffs made from 4- or 5-acylamino-1-amino-anthraquinone-2-aldehydes or their anils can also be produced by condensing 1,4- or 1,5-diamino-anthraquinone-2-aldehydes or their anils with dithio oxamide and subsequently carrying out an acylation with acid halides, for example the acid halides of the acids listed above.

Naturally, it is also possible by using a mixture of two differently substituted anthraquinone-aldehydes or their anils to produce the corersponding asymmetric dyestuffs or dyestuff mixtures. If 1-chloro-anthraquinone-2-aldehyde or its anil is used as the condensation component the chlorine atoms of the resulting dyestuff can be exchanged with amino groups by the reaction with p-toluenesulfamide and subsequent saponification. The dyestuff obtained is identical with the product obtained from 1-amino-anthraquinone-2-aldehyde.

The dyestuffs are produced by heating the anthraquinone aldehydes or their anils with dithio oxamide in inert organic solvents to about 80–200° C. Suitable solvents are, for example, halogenated benzene hydrocarbons such as o-dichlorobenzene; nitrobenzene; methylnaphthalene; glacial acetic acid; alcohols, such as amyl alcohol; and glycol ethers, such as ethyleneglycol-monoethylether, or their esters, for example the acetate; dimethylformamide or -sulfoxide; pyridine, alkylpyridines or mixtures thereof.

It is of special importance that it is not necessary to use the substituted free anthraquinone aldehydes which are not easily obtainable, but the process according to the invention can be started with the corresponding aldehyde-anils which can be easily produced, for example, by oxidation of the corresponding methylanthraquinones with nitrobenzene.

The obtainable anthraquinone dyestuffs are either used as such or in the form of leuco-ester salts, which are produced by known methods, for dyeing or printing animal or preferably vegetable or artificial fibres, for example wool, silk, but particularly cotton, linen, regenerated cellulose, rayon or polyamide or polyurethane fibres. Yellow, blue, grey, green and brown dyeings or prints are obtained distinguished by excellent fastness to wet processing and light as well as their resistance to water drops and their intense coloration.

The following examples are given for the purpose of illustrating the invention:

*Example 1*

19.5 parts 1-amino-anthraquinone-2-aldehyde-anil and 3.6 parts dithio oxamide are heated to the boil in 150 parts dimethylformamide within one hour and then boiled for about 5–6 hours. The reddish-blue needles formed are filtered off with suction and, after cooling, are separated from the solvent in the usual manner. The dyestuff thus obtained crystallises in boiling nitrobenzene to reddish blue prisms, yields, when vatted, a blue-grey vat and has, according to analysis, the following constitution

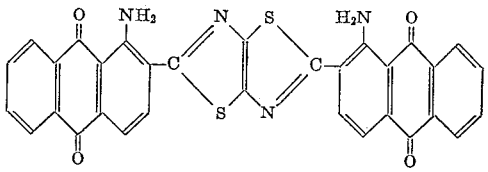

0.2 g. of the dyestuff are added at 50° C. to 200 cc. of a dye liquor consisting of 1.4 cc. sodium hydroxide solution (38° Bé.), 0.8 g. hydrosulphite, 4 g. sodium sulphate and a suitable quantity of water. The mixture is left to vat for 15 minutes at 50° C., and then a pre-wetted cotton skein (10 g.) is dyed in the blue-grey vat for about 45 minutes at 50° C. The dye is squeezed off, oxidised in air, then well rinsed and acidified with a solution of 4 g. acetic acid per litre. The rinsed goods are soaped at the boil for 15 minutes, rinsed and dried in the usual manner. A reddish dark-blue colour is obtained, distinguished by very good fastness to light and wet processing and resistant to water-drops.

If for the production of this dyestuff we used instead of the above mentioned 1-amino-anthraquinone-2-aldehyde-anil its 6- or 7-methyl- or ethylsulphono-, 6- or 7-phenyl-sulphono- or 6- or 7-sulphonamide derivatives, which may be substituted in the amide nitrogen atom with one or two methyl- or ethyl groups, reddish dark-blue dyeing products with excellent fastness properties were likewise obtained.

Instead of carrying out the production of the dyestuff in dimethylformamide it can be done, with equal success, using solvents such as o-dichlorobenzene, nitrobenzene, dimethylsulphoxide, glacial acetic acid, ethylene-glycol, ethylene-glycol-monoethyl ether, ethylene-glycol-monomethyl ether acetate or mixtures thereof.

*Example 2*

22.2 parts 6-chloro-1-amino-anthraquinone-2-aldehyde-anil and 3.6 parts dithio oxamide are heated to the boil in 150 parts dimethylformamide until the reaction is completed. The dyestuff, separated in the usual manner, dyes cotton from a blue-grey vat in neutral dark blue shades with very good fastness to wet processing, light and water-drops and has the following constitution

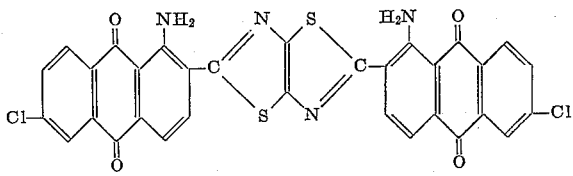

Products with similar dyeing properties are obtained when using instead of 6-chloro-1-amino-anthraquinone-2-aldehyde-anil equivalent quantities of 7-chloro-, 6- or 7-chloro or 6,7-dichloro-1-amino-anthraquinone - 2 - aldehyde-anil or corresponding bromo- or fluoro derivatives.

*Example 3*

20 parts anthraquinone-2-aldehyde and 5.1 parts dithio oxamide are heated to the boil in 150 parts dimethylformamide until the dyestuff formation is completed. The crystallised dyestuff is filtered off with suction and separated from the solvent in the usual manner. The product dyes cotton from an olive coloured vat in clear yellow shades with very good fastness properties and has the following constitution:

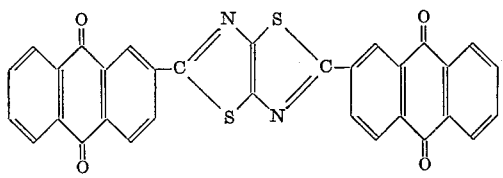

*Example 4*

5.5 parts anthraquinone-2-aldehyde are transformed into the anil by heating them with 2.3 parts aniline in 150 parts dimethylformamide. 7.5 parts 1-amino-anthraquinone-2-aldehyde-anil and 2.7 parts dithio oxamide are added and the mixture is heated to boiling point for about 4 hours. After termination of the condensation the reaction product, crystallised in the form of beautiful dark brown needles, is filtered off with suction and separated from the solvent in the usual manner. The dyestuff dyes cotton from a blue-grey vat in brownish black shades and has the following constitution:

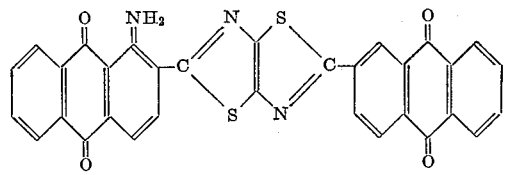

*Example 5*

15 parts 1-amino - 4 - benzoylamino-anthraquinone-2-aldehyde-anil and 1.9 parts dithio oxamide are heated to the boil for about 2 hours together with 150 parts dimethylformamide. The blue-green product thus obtained is separated in the usual manner and dyes cotton from a blue-grey vat in bluish green shades, which possess excellent fastness to light and wet processing. According to analysis, the dyestuff has the following constitution:

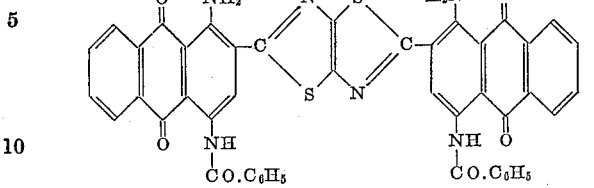

Dyestuffs with similar dyeing properties can be obtained by using instead of 1-amino-4-benzoylamino-anthraquinone-2-aldehyde-anil 1-amino-4-(o-chloro)-, -4-(m-chloro)- or -4-(p-chloro)-benzoylaminoanthraquinone-2-aldehydeanil or corresponding 1-amino-4-fluoro- or bromobenzoyl-amino-anthraquinone-2-aldehyde-anils.

*Example 6*

34.1 parts 1,4-diamino-anthraquinone-2-aldehyde-anil are heated to the boil together with 6 parts dithio oxamide in 300 parts dimethylformamide until the formation of the intermediary product of the formula

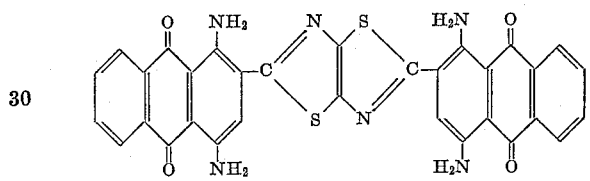

is terminated. If subsequently 25 parts of the intermediary product are acylated in 360 parts nitrobenzene by the addition of 19 parts 2,4-dichlorobenzoyl chloride at 80–100° C. and heating the reaction mixture to 160–205° C. a dyestuff of the formula

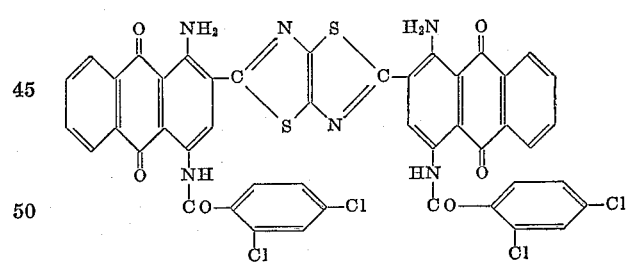

is obtained which dyes cotton from a blue-grey vat in bluish green shades with excellent fastness properties. A dyestuff with similar dyeing properties is obtained by using instead of 2,4-dichlorobenzoyl chloride an equivalent quantity of m-trifluoromethylbenzoyl fluoride.

*Example 7*

To 20 parts of the intermediary product described in Example 6 in 200 parts nitrobenzene there are added at 80–100° C. 15 parts diphenyl-4-carboxylic acid chloride and the mixture is heated to 180–205° C. until acylation is terminated. The dyestuff obtained has the formula

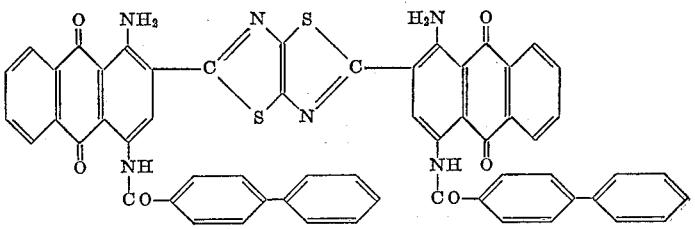

and dyes cotton from a blue-grey vat in bluish green shades.

*Example 8*

7.5 parts 1-amino-anthraquinone-2-aldehyde-anil, 11 parts 1 - amino - 4 - benzoylamino - anthraquinone - 2 - aldehyde-anil and 2.7 parts dithio oxamide are heated to the boil in 120 parts dimethylformamide and 20 parts glacial acetic acid until the dyestuff formation ceases to increase. The dyestuff separated in the usual manner, of the formula

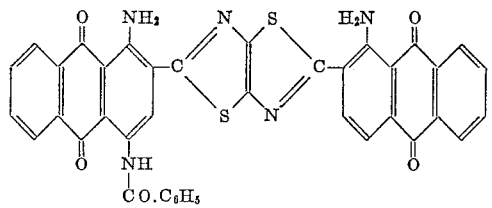

dyes cotton from a blue-grey vat in intense marine blue shades, distinguished by very good fastness to wet processing, excellent fastness to light and fastness to water-drops. If an equivalent quantity of 1-amino-4-(p-methoxy - benzoylamino) - anthraquinone - 2 - aldehyde - anil is used instead of 1-amino-4-benzoylamino-anthraquinone-2-aldehydeanil a slightly greenish marine blue dyestuff of similar dyeing properties is obtained.

*Example 9*

15 parts 1-amino-5-benzoylamino-anthraquinone-2-aldehyde-anil and 1.9 parts dithio oxamide are heated in 120 parts nitrobenzene and 5 parts glacial acetic acid for about 5 hours to 150–160° C. The product thus obtained is filtered off with suction and separated from nitrobenzene by washing it with methanol. The dyestuff obtained, of the formula

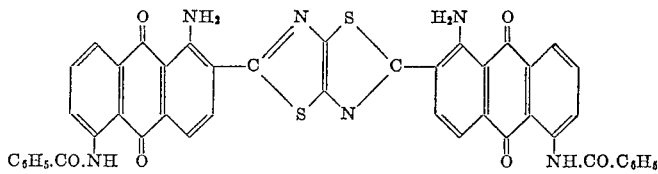

dyes cotton from a blue-grey vat in blue-black shades with good fastness properties. If, instead of 1-amino-5-benzoylamino-anthraquinone-2-aldehyde-anil, an equivalent quantity of 1-amino-5-(p-ethyl-sulphonylbenzoyl-amino)-anthraquinone-2-aldehydeanil is used, a dyestuff of similar dyeing properties is obtained.

*Example 10*

7.5 parts 1-amino-4-benzoylamino-anthraquinone-2-aldehydeanil and 7.5 parts 1-amino-5-benzoylamino-anthraquinone-2-aldehyde-anil are heated to the boil together with 1.9 parts dithio oxamide in 150 parts of dimethylformamide until the dyestuff formation stops increasing. The dyestuff separated in the usual manner, of the formula

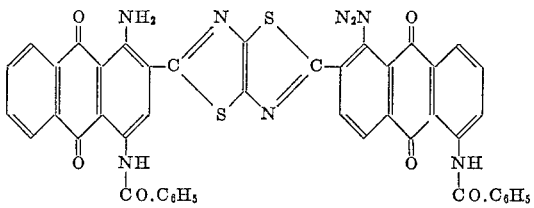

dyes cotton from a blue-grey vat in greenish dark-blue shades distinguished by their fastness to wet processing and their resistance to water-drops.

*Example 11*

15 parts thiazolanthrone-2-aldehyde-anil and 2.64 parts dithio oxamide are heated to the boil together with 120 parts dimethylformamide for about 4–5 hours. The product, crystallised in yellow needles, is filtered off with suction, washed with methanol and dried. The dyestuff thus obtained, having the formula

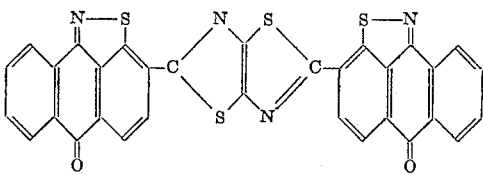

dyes cotton from a brown vat in clear yellow shades with excellent fastness to wet processing and light.

*Example 12*

5.5 parts anthraquinone-2-aldehyde are transformed into the corresponding anil by heating it with 2.3 parts aniline and 120 parts dimethylformamide. 11 parts 1 - amino - 4 - benzoylamino - anthraquinone - 2 - aldehydeanil and 2.7 g. dithio oxamide are added and the mixture is heated to the boil for about 4–5 hours. The dyestuff, separated in the usual manner, having the probable formula

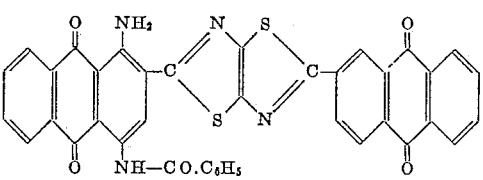

dyes cotton from a blue-grey vat in yellowish green shades which possess excellent fastness to light and wet processing.

*Example 13*

7.7 parts anthraquinone-2-aldehyde are transformed into the corresponding anil by heating them with 3.2 parts aniline and 120 parts dimethylformamide. After adding 6.6 parts 1-amino-4-benzoylamino-anthraquinone-2-aldehydeanil the mixture is heated to the boil until dyestuff formation stops increasing and the dyestuff thus obtained, which is a mixture of the dyestuffs obtained under Examples 3, 5 and 12, is separated in the usual manner. The product obtained dyes cotton from a blue-grey vat in fast yellow green shades.

*Example 14*

5.5 parts anthraquinone-2-aldehyde are transformed into the corresponding anil by heating them with 2.3 parts aniline and 120 parts dimethylformamide. 11 parts 1 - amino - 5 - benzoyl - amino - anthraquinone - 2 - aldehyde anil are added, the mixture is heated to the boil for about 4–5 hours and the product thus formed is separated. The dyestuff obtained, of the probable formula

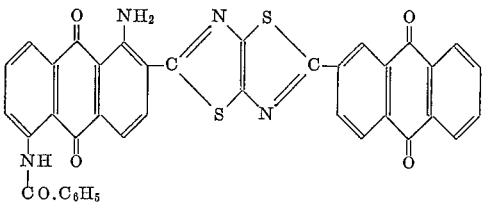

dyes cotton from a grey vat in olive-coloured shades, distinguished by their fastness to wet processing and light.

I claim:
1. A dyestuff of the formula

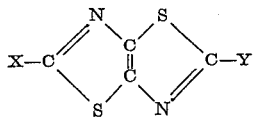

wherein X and Y are members selected from the group consisting of anthraquinonyl, thiazolanthrone and anthraquinonyl substituted, when desired, by a member selected from the group consisting of halogen, amino-, benzoylamino, naphthoylamino, monohalobenzoylamino, monohalonaphthoylamino, dihalobenzoylamino, dihalonaphthoylamino, diphenylamino, alkylbenzoylamino, alkylnaphthoylamino, alkoxybenzoylamino, alkoxy naphthoylamino, alkylsulfonbenzoylamino, alkylsulfononaphthoylamino, cinnamoyl amino, alkylsulfono; phenylsulfono- and sulfonamido.

2. Dyestuff of the formula

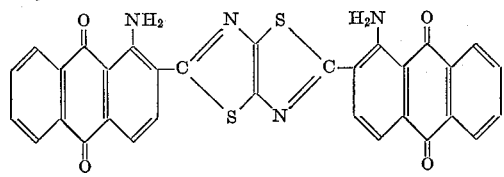

3. Dyestuff of the formula

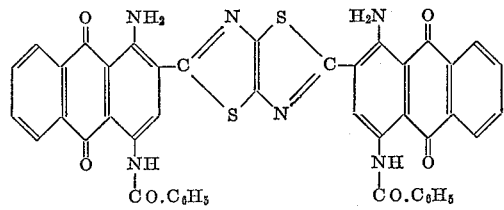

4. Dyestuff of the formula

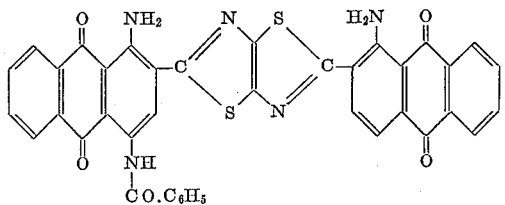

5. Dyestuff of the formula

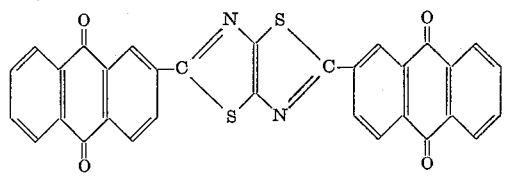

6. Dyestuff of the formula

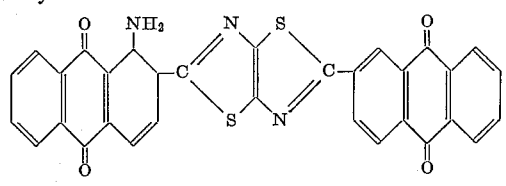

References Cited by the Examiner

Degering: An Outline of Organic Nitrogen Compounds (Michigan, 1945), pages 491–2.

Johnson et al.: J. Am Chem. Soc., vol. 82, pages 2719–2724 (1960).

NICHOLAS S. RIZZO, *Primary Examiner.*

JOHN D. RANDOLPH, WALTER A. MODANCE,
*Examiners.*